(12) United States Patent
Choi et al.

(10) Patent No.: US 10,437,362 B2
(45) Date of Patent: Oct. 8, 2019

(54) TOUCH WINDOW AND DISPLAY DEVICE COMPRISING SAME

(71) Applicant: LG INNOTEK CO., LTD., Seoul (KR)

(72) Inventors: Joon Rak Choi, Seoul (KR); Hyung Min Sohn, Seoul (KR); Sun Young Lee, Seoul (KR); Young Jae Lee, Seoul (KR); Soo Kwang Yoon, Seoul (KR); Hyun Seok Lim, Seoul (KR); Gwang Hei Choi, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 25 days.

(21) Appl. No.: 15/025,255

(22) PCT Filed: Aug. 21, 2014

(86) PCT No.: PCT/KR2014/007764
§ 371 (c)(1),
(2) Date: Mar. 25, 2016

(87) PCT Pub. No.: WO2015/046756
PCT Pub. Date: Apr. 2, 2015

(65) Prior Publication Data
US 2016/0216793 A1  Jul. 28, 2016

(30) Foreign Application Priority Data

Sep. 27, 2013 (KR) .......................... 10-2013-0115668
Sep. 30, 2013 (KR) .......................... 10-2013-0115902

(51) Int. Cl.
*G06F 3/041* (2006.01)
(52) U.S. Cl.
CPC ............ *G06F 3/041* (2013.01); *G06F 3/0416* (2013.01)

(58) Field of Classification Search
CPC ...... G06F 3/044; G06F 3/03547; G06F 3/047; G06F 2203/04111
See application file for complete search history.

(56) References Cited

U.S. PATENT DOCUMENTS

2008/0303798 A1   12/2008   Matsudate et al.
2011/0099805 A1   5/2011    Lee
(Continued)

FOREIGN PATENT DOCUMENTS

CN          101320310         12/2008
KR    10-2008-0096977 A       11/2008
(Continued)

OTHER PUBLICATIONS

International Search Report (with English translation) and Written Opinion dated Dec. 11, 2014 issued in Application No. PCT/KR2014/007764.
(Continued)

*Primary Examiner* — William Boddie
*Assistant Examiner* — Jeffrey Parker
(74) *Attorney, Agent, or Firm* — Ked & Associates, LLP

(57) ABSTRACT

A touch window according to one embodiment comprises: a substrate having an effective area and an ineffective area; a sensing electrode arranged in the effective area and sensing a position; and a wiring arranged in the effective area and the ineffective area and electrically connecting to the sensing electrode, wherein the wiring comprises a first wiring and a second wiring such that the first wiring and the second wiring are vertically arranged.

10 Claims, 5 Drawing Sheets

(56) References Cited

U.S. PATENT DOCUMENTS

| | | | |
|---|---|---|---|
| 2013/0021296 A1 | 1/2013 | Min et al. | |
| 2014/0071064 A1* | 3/2014 | Cho | G06F 3/044 345/173 |
| 2014/0144689 A1* | 5/2014 | Yuan | H05K 1/0289 174/261 |
| 2014/0210784 A1* | 7/2014 | Gourevitch | H03K 17/962 345/174 |
| 2016/0124546 A1* | 5/2016 | Chen | G06F 3/044 345/174 |
| 2016/0370889 A1* | 12/2016 | Chi | G06F 3/041 |

FOREIGN PATENT DOCUMENTS

| | | |
|---|---|---|
| KR | 10-2010-0054897 A | 5/2010 |
| KR | 10-2011-0109788 A | 10/2011 |
| KR | 10-2012-0012005 A | 2/2012 |
| KR | 10-2012-0101310 A | 9/2012 |
| KR | 10-2013-0035696 A | 4/2013 |

OTHER PUBLICATIONS

Chinese Office Action (with English translation) dated Mar. 14, 2018 issued in Chinese Application No. 201480053614.4.

\* cited by examiner

TOUCH WINDOW AND DISPLAY DEVICE COMPRISING SAME

CROSS-REFERENCE TO RELATED PATENT APPLICATIONS

This application is a U.S. National Stage Application under 35 U.S.C. § 371 of PCT Application No. PCT/KR2014/007764, filed Aug. 21, 2014, which claims priority to Korean Patent Application Nos. 10-2013-0115668, filed Sep. 27, 2013; and 10-2013-0115902 file Sep. 30, 2013, whose entire disclosures are hereby incorporated by reference.

TECHNICAL FIELD

The embodiments of the present disclosure relate to a touch window and a display device including the same.

BACKGROUND ART

Recently, a touch panel, which performs an input function through the touch to an image displayed on a display by an input device such as a stylus pen or a finger, has been applied to various electronic appliances The touch panel may be typically classified into a resistive touch panel and a capacitive touch panel. In the resistive touch panel, the position of the touch point is sensed as short of an electrode occurs due to the pressure by an input device. In the capacitive touch panel, the position of the touch point is sensed by sensing the variation of capacitance between electrodes when a finger of the user touches the capacitive touch panel.

A deco layer for forming a logo or the like is formed in the bezel of the touch panel, and the uniformity of the electrodes formed on the deco layer cannot be guaranteed due to step difference of the deco layer and bubbles may be generated. Accordingly, electrical characteristics may deteriorate or reliability may be lowered due to inferiorities.

Further, an in-use area of the user may be restricted on the front surface of the touch panel due to the bezel in which wiring lines that electrically connect the electrodes are disposed, which causes an inconvenience in using the touch panel. Further, there is a limit in designing the touch panel due to the presence of the bezel.

DISCLOSURE

Technical Problem

Embodiments of the present disclosure provide a touch window having an improved reliability and a display device including the same.

Technical Solution

According to an embodiment of the present disclosure, there is provided a touch window including: a substrate having an active area and an unactive area; a sensing electrode disposed on the active area to sense a position; and wiring lines disposed on the active area and the unactive area to electrically connect the sensing electrode, wherein the wiring lines comprise a first wiring line and a second wiring line, and the first wiring line and the second wiring line are vertically disposed.

According to another embodiment of the present disclosure, there is provided a touch window including: a substrate; a deco layer on the substrate; a sensing layer on the substrate; and an intermediate layer on the deco layer, wherein the touch window comprises wiring lines on the intermediate layer that electrically connect the sensor electrode.

Advantageous Effects

Embodiments of the present disclosure can reduce the width of a bezel by vertically disposing a first wiring line and a second wiring line. Accordingly, a wide screen area can be provided, and thus a limitation in design due to a bezel can be overcome.

Further, the embodiments of the present disclosure include an intermediate layer disposed on a deco layer and the intermediate layer can planarize the deco layer. Because wiring lines and the like are formed on the intermediate layer, the coating uniformity and attachment force of the wiring lines can be guaranteed. Furthermore, a step difference of the deco layer can be compensated for through the intermediate layer, and a problem caused by the step difference can be improved. That is, bubbles that may be generated due to the step difference of the deco layer can be prevented.

Then, the intermediate layer may include a first intermediate part and a second intermediate part. A sensing electrode can be prevented from being oxidized and can be protected through the first intermediate part, and a first wiring line can be prevented from being oxidized and can be protected through a second intermediate part. Furthermore, the first wiring line and a second wiring line can be insulated through the second intermediate part.

In addition, because the first intermediate part and the second intermediate part are integrally formed, costs such as process costs, investment costs, or material costs can be reduced and process time can be shortened by preventing repetition of processes. Moreover, reliability can be enhanced by removing a border between an active area and an unactive area. That is, penetration of moisture and oxidation that may be generated at a border between the active area and the unactive area can be prevented.

BEST MODE

Mode for Invention

Hereinafter, preferred embodiments of the present disclosure will be described with reference to the accompanying drawings.

Figure 1:
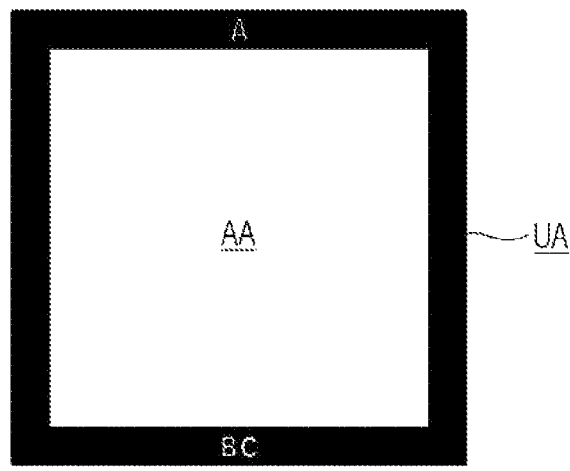
FIG. 1 is a schematic plan view of a touch window according to a first embodiment of the present disclosure.
Figure 2:
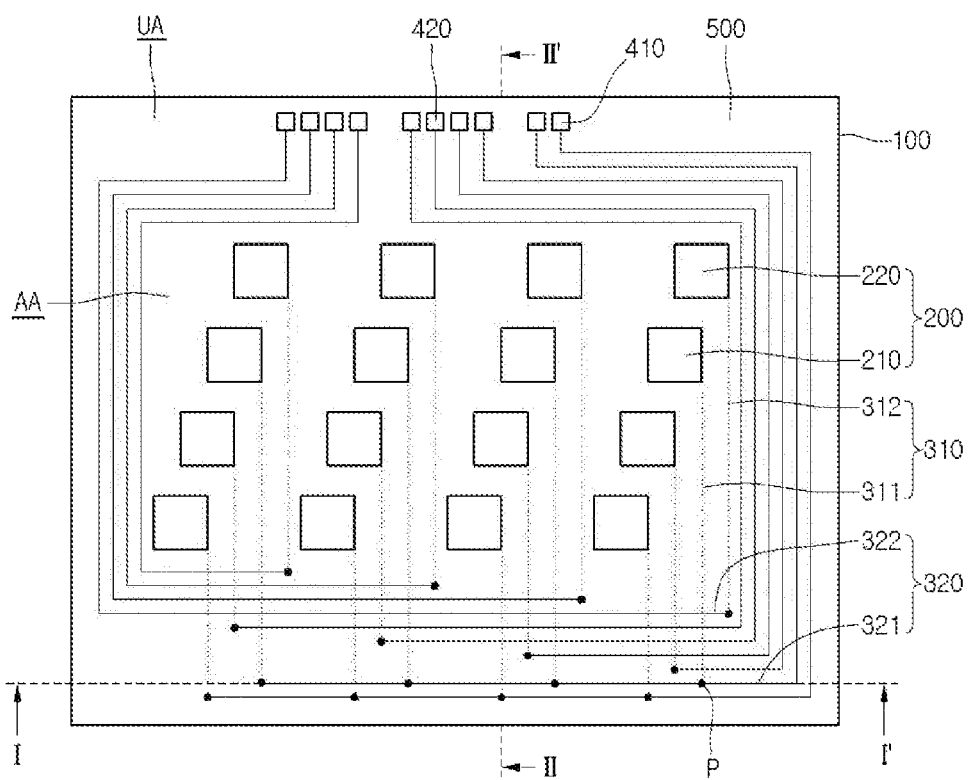
FIG. 2 is a plan view of a touch window according to the first embodiment of the present disclosure.
Figure 3:
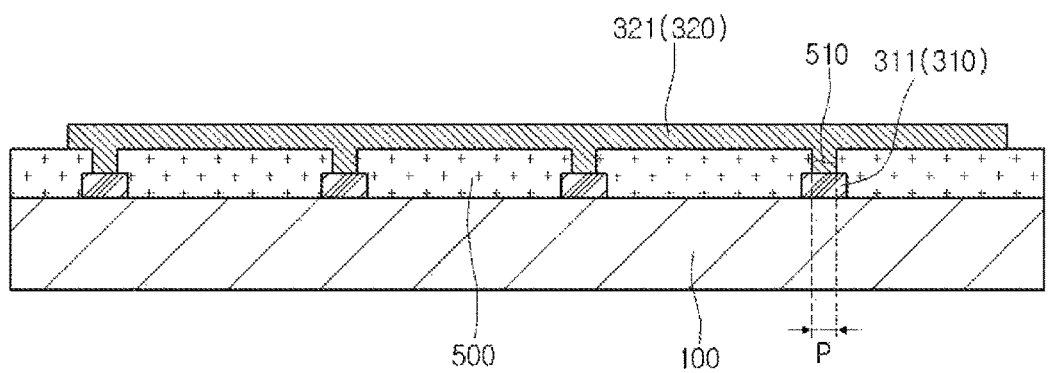
FIG. 3 is a sectional view illustrating a section taken along line I-I' of FIG. 2.
Figure 4:
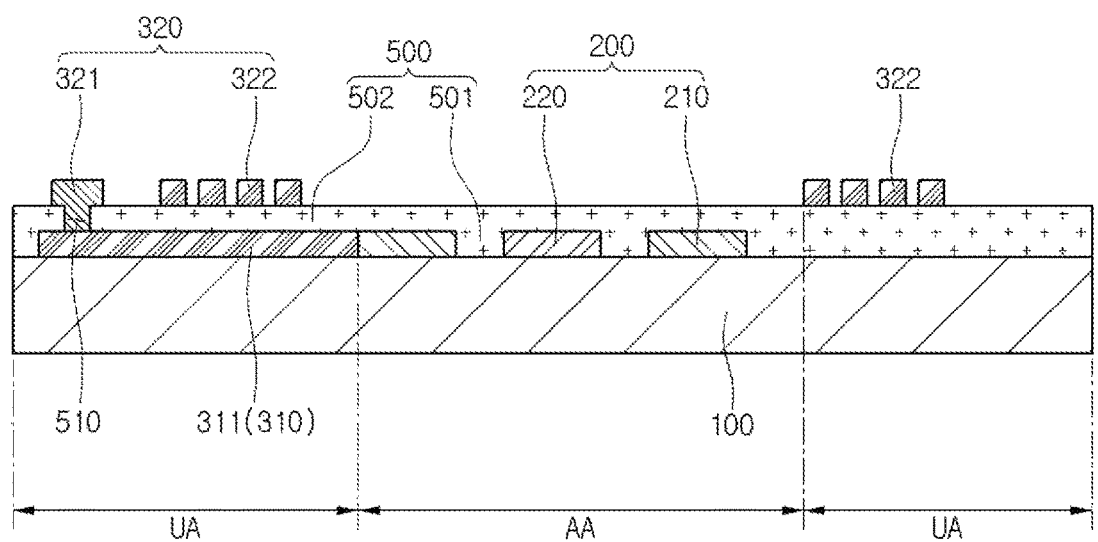
FIG. 4 is a sectional view illustrating a section taken along line II-II' of FIG. 2.

First, referring to FIGS. 1 to 4, a touch window according to a first embodiment of the present disclosure will be described. FIG. 1 is a schematic plan view of a touch window according to a first embodiment of the present disclosure. FIG. 2 is a plan view of a touch window according to the first embodiment of the present disclosure. FIG. 3 is a sectional view illustrating a section taken along line I-I' of FIG. 2. FIG. 4 is a sectional view illustrating a section taken along line II-II' of FIG. 2.

Referring to FIGS. 1 to 4, the touch window 10 according to the embodiment of the present disclosure includes a substrate 100 in which an active area AA in which the position of an input device (for example, a finger) is sensed and an unactive area UA disposed around the active area AA are defined.

Here, a sensing electrode 200 may be formed in the active area AA to sense the input device. Wiring lines 310 and 320 that electrically connect the sensing electrode 200 may be formed in the unactive area UA. An external circuit and the like connected to the wiring lines 310 and 320 may be situated in the unactive area UA.

If the input device such as a finger makes contact with the touch window, a difference in electrostatic capacities is generated at a portion with which the input device makes contact, and the portion having the difference may be sensed as a contact position.

The touch window will be described in more detail as follows.

The substrate 100 may be formed of various materials that may support the sensing electrode 200 and the wiring lines 310 and 320 formed on the substrate 100, a circuit board, and the like. The substrate 100 may include glass or plastic. For example, the substrate 100 may include chemically tempered glass such as aluminosilicate glass, semi-tempered glass, or soda lime glass. The substrate 100 may include reinforced or flexible plastic including a film or resin such as polyethylene terephthalate (PET) or polyimide (PT).

Further, the substrate 100 may include sapphire. Sapphire has very excellent characteristics such as permittivity so that it may remarkably improve touch reaction speed and may easily implement a space touch such as hovering, and has a high surface strength so that it is suitable for a cover substrate. Hovering is a technology for recognizing a coordinate from a distance that is slightly distant from the display.

Further, the substrate 100 may include an optically isotropic film. For example, the substrate 100 may include a cyclic olefin copolymer (COC), a cyclic olefin polymer (COP), optical isotropic polycarbonate (PC), or optically isotropic polymethyl methacrylate (PMMA).

That is, the substrate 100 may be a rigid substrate or a flexible substrate having flexible characteristics. Further, the substrate 100 may be a curved or bended substrate. Accordingly, the touch window including the substrate 100 may be also formed to have flexible, curved, or bended characteristics. Due to this, the touch window according to the embodiment of the present disclosure may be easily carried and may be modified to have various designs.

A deco layer may be formed in the unactive area UA of the substrate 100. The deco layer may be formed by applying a material having a predetermined color so that the wiring lines 310 and 320, the printed circuit board that connects the wiring lines 310 and 320 to an external circuit, and the like are not be viewed from the outside. The deco layer may have a color suitable for a desired external appearance, and for example, may include a black pigment to have a black color. Further, the deco layer may be formed to represent a desired logo or the like in various methods. The deco layer may be formed through deposition, printing, wet coating, or the like.

The deposition electrode 200 is disposed in the active area AA of the substrate 100. The sensing electrode 200 may sense whether the input device such as a finger makes contact with the touch window. The sensing electrode 200 may include a conductive material.

The sensing electrode 200 may include a transparent conductive material such that an electric current may flow through the sensing electrode 200 while not hampering transmission of light. For example, the sensing electrode 200 may be formed of any one selected from the group consisting of indium tin oxide, indium zinc oxide, copper oxide, tin oxide, zinc oxide, titanium oxide, and a combination thereof.

Further, the sensing electrode 200 may include a nano wire, a photosensitive nano wire film, a carbon nano tube (CNT), or graphene. Further, the sensing electrode 200 may include various metals having an excellent electrical conductivity. For example, the sensing electrode 200 may include at least one metal of chrome (Cr), nickel (Ni), copper (Cu), aluminum (Al), silver (Ag), molybdenum (Mo), gold (Au), titanium (Ti), and an alloy thereof.

Then, the sensing electrode 200 may be disposed in a mesh shape including a metal. The mesh shape may be formed at random to prevent a Moire phenomenon. The Moire phenomenon is a phenomenon in which due to a pattern caused when periodic stripe patterns overlap each other, adjacent stripe patterns overlap each other such that the thickness of the stripe patterns becomes larger so that the stripe pattern having the large thickness becomes outstanding. Accordingly, various conductive pattern shapes may be disposed to prevent the Moire phenomenon.

In detail, the conductive pattern may include an opening and a linear part. Then, the line width of the linear part of the conductive pattern may be 0.1 µm to 10 µm. When the line width is 0.1 µm or less, the linear part of the conductive pattern cannot be manufactured. When the line width is 10 µm or less, the pattern of the sensing electrode 200 can be made not to be viewed by the naked eyes. Preferably, the line width of the linear part of the conductive pattern may be 0.5 µm to 7 µm. More preferably, the line width of the linear part of the conductive pattern may be 1 µm to 3.5 µm.

The opening of the conductive pattern may have various shapes such as a polygonal shape including a tetragonal shape, a diamond shape, a pentagonal shape, or a hexagonal shape, and a circular shape, which are uniformly disposed. That is, the conductive pattern may have a regular shape.

However, the embodiment of the present disclosure is not limited thereto, and the conductive pattern may have an irregular shape. That is, various openings may be provided in one conductive pattern.

When the sensing electrode 200 has a mesh shape, the pattern may be made not to be viewed even though the sensing electrode 200 is formed of a metal material. Further, because the resistance of the sensing electrode 200 may be lowered, the sensing electrode 200 may be applied to a large-sized substrate 100. Further, when the substrate 100 is deflected, the sensing electrode 200 may be deflected without being physically damaged. Accordingly, the sensing electrode 200 may be applied to a touch window having a larger area, and the touch window may be applied to a flexible touch device or a curved touch device. Further, the bending characteristics and reliability of the touch window can be improved.

The sensing electrode 200 may be formed of a conductive polymer. When the sensing electrode 200 is formed of a conductive polymer, it may form a transparent pattern. Further, the sensing electrode 200 formed of a conductive polymer may be flexible, and may be applied to a flexible touch device or a curved touch device. Further, the conductive polymer may form a touch device formed of a material having a low density so that the touch device has a light weight.

The sensing electrode 200 may include a transmission electrode 210 and a reception electrode 220. The transmission electrode 210 and the reception electrode 220 are disposed adjacent to each other.

The transmission electrode 210 may sense the position of the input device. In detail, the transmission electrode 210 may transmit an electrical signal when the input device is touched.

The reception electrode 220 may sense the position of the input device. In detail, the reception electrode 220 may receive an electrical signal when the input device is touched.

That is, the transmission electrode 210 may sequentially apply voltages to the wiring lines 310 and 320 such that the reception electrode 220 senses a change in static capacities by using the voltages applied to the wiring lines 310 and 320.

The transmission electrode 210 and the reception electrode 220 may be disposed on the same substrate 100. That is, the transmission electrode 210 and the reception electrode 220 may be disposed on the same plane with the substrate to form an I layer structure.

Subsequently, the wiring lines 310 and 320 may include a first wiring line 310 and the second wiring line 320.

The first wiring line 310 and the second wiring line 320 may be vertically disposed. In detail, an intermediate layer 500 is disposed between the first wiring line 310 and the second wiring line 320, and the first wiring line 310 and the second wiring line 320 may be vertically disposed while the intermediate layer 500 is interposed therebetween.

The first wiring line 310 may be disposed on the substrate 100. The first wiring line 310 may be disposed on the same plane as that of the sensing electrode 200.

The first wiring line 310 may be electrically connected to the sensing electrode 200. That is, the first wiring line 310 may be electrically connected to the sensing electrode 200 while making direct contact with the sensing electrode 200. The first wiring line 310 may be connected to one end of the sensing electrode 200.

Further, referring to FIG. 3, the first wiring line 310 may be electrically connected to the second wiring line 320. That is, the first wiring line 310 may be electrically connected to the second wiring line 320 while making direct contact with the second wiring line 320. The first wiring line 310 and the second wiring line 320 include a contact point P where they make direct contact with each other. Then, the intermediate layer 500 includes a hole 510, and the first wiring line 310 and the second wiring line 320 may be connected to each other through the hole 510. That is, the hole 510 may be situated at the contact point P. The intermediate layer 500 may insulate the first wiring line 310 and the second wiring line 320 at portions other than the contact point P. Thus, an electrical short circuit can be prevented.

The first wiring line 310 may extend from the active area AA to the unactive area UA. That is, the first wiring line 310 is connected to the sensing electrode 200 in the active area AA, and may be connected to the second wiring line 320 in the unactive area UA.

The first wiring line 310 may be transparent at a portion where the active area AA is disposed. Accordingly, the first wire line 310 may be made not to be visually recognized in the active area AA that is a screen area.

The first wiring line 310 may include a nano wire, a carbon nano tube (CNT), graphene, or various metals. The intermediate layer 500 may be disposed on the first wiring line 310 to prevent oxidation of the first wiring line 310 and protect the first wiring line 310.

The first wiring line 310 may include a first wiring line 311 that connects the transmission electrode 210 and a first wiring line 312 that connects the reception electrode 220.

The first wiring lines 311 that connect the transmission electrode 210 may make contact with the corresponding second wiring line 321. That is, the first wiring lines 311 of the transmission electrodes 210 disposed in the same direction of the substrate 100 may make contact with the corresponding second wiring line 321 through the holes 510 at the contact points P. Accordingly, the same signal may be applied to the transmission electrode 210.

The first wiring lines 312 that connect the reception electrode 220 may be connected to the second wiring lines 322 that connect the reception electrode 220.

Meanwhile, the second wiring lines 320 are disposed on the first wiring line 310. That is, the second wiring lines 320 are disposed on the intermediate layer 500.

The second wiring line 320 may be disposed in the unactive area UA. The second wiring line 320 may be connected to the first wiring line 310 at a lower end of the substrate 100, and may be extracted to an upper end of the substrate 100. The second wiring line 320 may be connected to the circuit board at an upper end of the substrate 100.

The second wiring line 320 may be formed of a metal having an excellent electrical conductivity. For example, the second wiring line 320 may be formed of chrome (Cr), nickel (Ni), copper (Cu), aluminum (Al), silver (Ag), molybdenum (Mo), and an alloy thereof.

The second wiring line 320 may include a first wiring line 321 that connects the transmission electrode 210 and a second wiring line 322 that connects the reception electrode 220.

Ends of the second wiring lines 320 may be disposed at one end of the substrate 100. That is, pad parts 410 and 420 may be disposed at ends of the second wiring lines 320, and the pad parts 410 and 420 may be disposed at one end of the substrate 100.

The pad parts 410 and 420 may be connected to the circuit board. Various types of circuit boards may be applied as the circuit board, and for example, a flexible printed circuit board (FPCB) or the like may be applied.

Through this, the transmission electrode 210 and the reception electrode 220 may be disposed on the same plane so that a sectional circuit board may be used. Further, the width of a bezel may be reduced through the first wiring line 310 and the second wiring line 320. Accordingly, the width of the circuit board may be also reduced.

Meanwhile, the intermediate layer 500 may include a photosensitive film. Accordingly, after the sensing electrode 200 and the first wiring line 310 are formed, the intermediate layer 500 is laminated on the entire surface of the substrate 100 and the hole 510 may be formed through exposure and development processes.

Referring to FIG. 4, the intermediate layer 500 may include a first intermediate part 501 and a second intermediate part 502.

The first intermediate part 501 may be disposed on the active area AA. The first intermediate part 501 may be disposed on the sensing electrode 200. The intermediate part 501 may prevent oxidation of the sensing electrode 200 and protect the sensing electrode 200.

Subsequently, the second intermediate part 502 may be disposed in the unactive area UA. The second intermediate part 502 may include the hole 510 so that the first wiring line 310 and the second wiring line 320 are connected to each other. The second intermediate layer 502 may be disposed on the first wiring line 310 to prevent oxidation of the first wiring line 310 and protect the first wiring line 310.

The first intermediate part 501 and the second intermediate part 502 may be integrally formed. The first intermediate part 501 and the second intermediate part 502 may include the same material, and may be formed through the same process. Accordingly, costs such as process costs, investment costs, and material costs can be reduced, and process time can be shortened by preventing repetition of processes. Further, because the first intermediate part 501 and the second intermediate part 502 are integrally formed, reliability can be enhanced by removing a border between the active area AA and the unactive area UA. That is, penetration of moisture and oxidation that may be generated at a border between the active area AA and the unactive area UA can be prevented.

Figure 5:
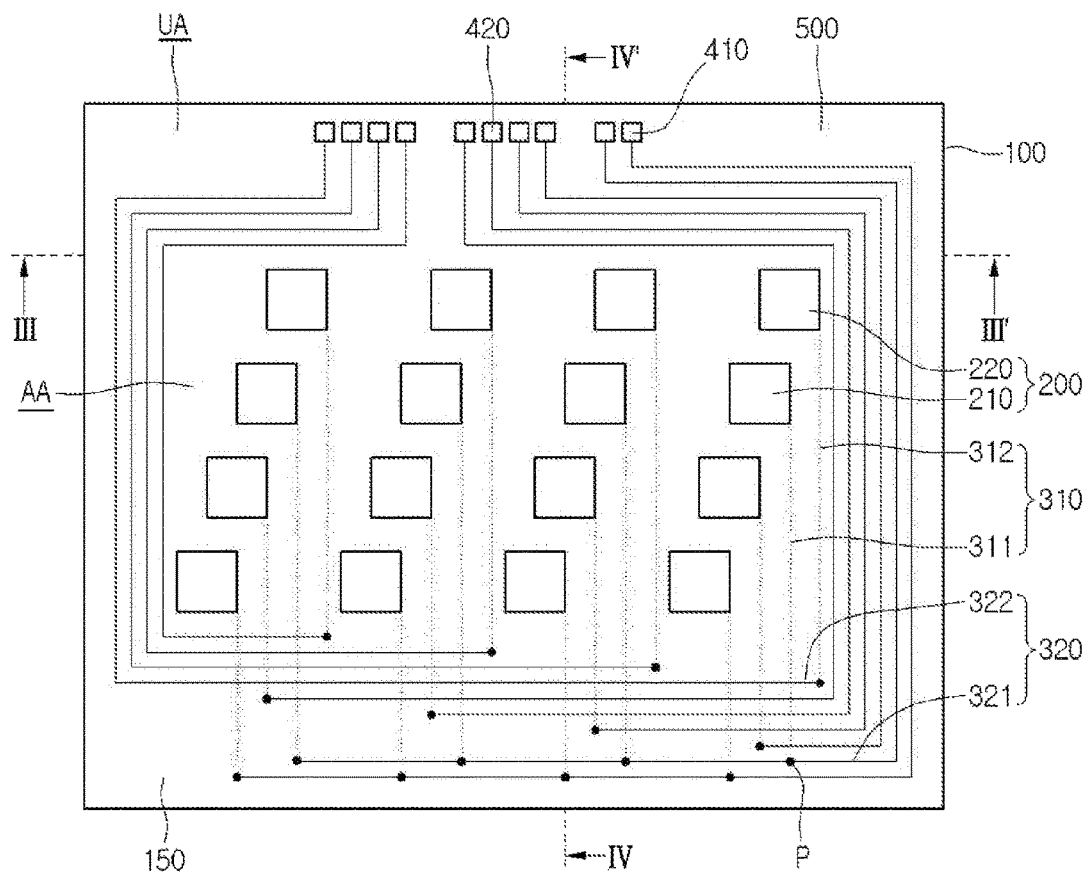
FIG. 5 is a plan view of a touch window according to a second embodiment of the present disclosure.
Figure 6:
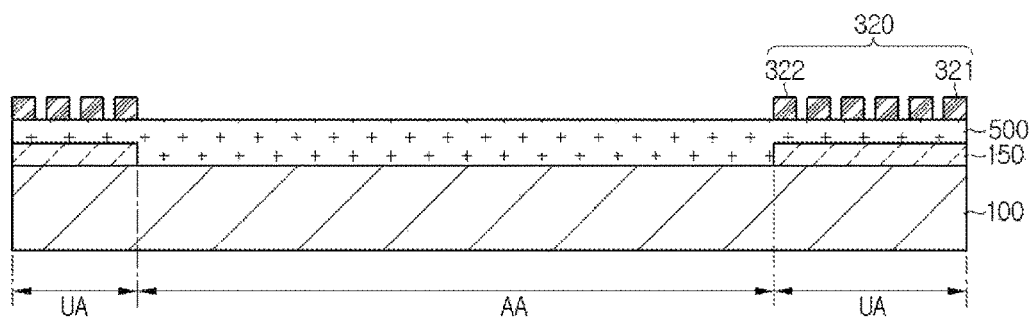
FIG. 6 is a sectional view illustrating a section taken along line III-III' of FIG. 5.
Figure 7:
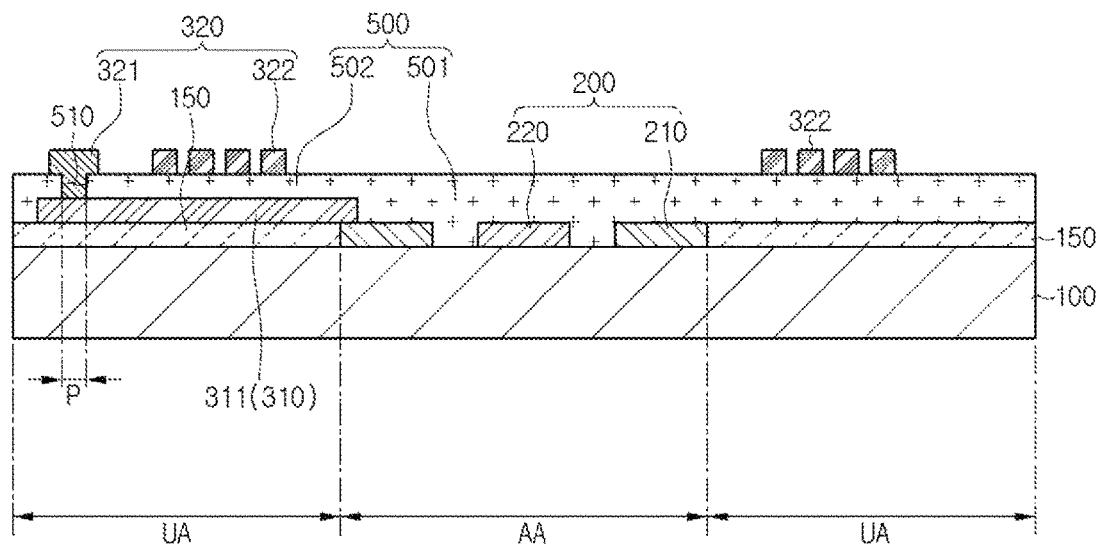
FIG. 7 is a sectional view illustrating a section taken along line IV-IV' of FIG. 5.

Subsequently, referring to FIGS. 5 to 7, a touch window according to a second embodiment of the present disclosure will be described. FIG. 5 is a plan view of a touch window according to a second embodiment of the present disclosure. FIG. 6 is a sectional view illustrating a section taken along line III-III' of FIG. 5. FIG. 7 is a sectional view illustrating a section taken along line IV-IV' of FIG. 5.

The touch window according to the second embodiment of the present disclosure may include the same or similar configurations to those of the touch window according to the first embodiment of the present disclosure. For clear and brief description, a repeated description of the aforementioned embodiment may be omitted. The same reference numerals denote the same configurations.

Referring to FIGS. 5 to 7, the touch window 10 according to the embodiment of the present disclosure includes a substrate 100 in which an active area AA and unactive area UA are defined.

Here, a sensing electrode 200 may be formed in the active area AA to sense the input device. Wiring lines 310 and 320 that electrically connect the sensing electrode 200 may be formed in the unactive area UA. An external circuit and the like connected to the wiring lines 310 and 320 may be situated in the unactive area UA.

A deco layer 150 is formed in the unactive area UA of the substrate 100. The deco layer 150 may be formed by applying a material having a predetermined color so that the wiring lines 310 and 320, the printed circuit board that connects the wiring lines 310 and 320 to an external circuit, and the like are not be viewed from the outside. The deco layer 150 may have a color suitable for a desired external appearance, and for example, may include a black pigment to have a black color. Further, the deco layer 150 may be formed to represent a desired logo or the like in various methods. The deco layer 150 may be formed through deposition, printing, wet coating, or the like.

An intermediate layer 500 may be disposed on the deco layer 150. The intermediate layer 500 may be disposed to cover the entire surface of the deco layer 150. The thickness of the intermediate layer 500 may be the same as or larger than the thickness of the deco layer 150.

The intermediate layer 500 may planarize the deco layer 150. Because the wiring line 320 and the like are formed on the intermediate layer 500, the coating uniformity and attachment force of the wiring line 320 can be guaranteed. Furthermore, a step due to the deco layer 150 can be compensated for through the intermediate layer 500, and a problem due to the step can be improved. That is, bubbles that may be generated by the step of the deco layer 150 can be prevented.

The intermediate layer 500 may include a photosensitive film. The intermediate layer 500 may include a light transmitting material having an insulating property, and for example, may include an ultraviolet curing resin so that a problem due to thermal curing cannot be generated.

Subsequently, the deposition electrode 200 is disposed in the active area AA of the substrate 100. The sensing electrode 200 may sense whether the input device such as a finger makes contact with the touch window. The sensing electrode 200 may include a transmission electrode 210 and a reception electrode 220. The transmission electrode 210 and the reception electrode 220 are disposed adjacent to each other.

The transmission electrode 210 may sense the position of the input device. In detail, the transmission electrode 210 may transmit an electrical signal when the input device is touched. The reception electrode 220 may sense the position of the input device. In detail, the reception electrode 220 may receive an electrical signal when the input device is touched. That is, the transmission electrode 210 may sequentially apply voltages to the wiring lines 310 and 320 such that the reception electrode 220 senses a change in electrostatic capacities by using the voltages applied to the wiring lines 310 and 320.

The transmission electrode 210 and the reception electrode 220 may be disposed on the same substrate 100. That is, the transmission electrode 210 and the reception electrode 220 may be disposed on the same plane with the substrate 100 to form an I layer structure.

Subsequently, the wiring lines 310 and 320 may include a first wiring line 310 and the second wiring line 320. The first wiring line 310 and the second wiring line 320 may be vertically disposed. In detail, an intermediate layer 500 is disposed between the first wiring line 310 and the second wiring line 320, and the first wiring line 310 and the second wiring line 320 may be vertically disposed while the intermediate layer 500 is interposed therebetween.

The first wiring line 310 may be disposed on the deco layer 150. The first wiring line 310 may be electrically connected to the sensing electrode 200. That is, the first wiring line 310 may be electrically connected to the sensing electrode 200 while making direct contact with the sensing electrode 200.

Further, referring to FIG. 7, the first wiring line 310 may be electrically connected to the second wiring line 320. That is, the first wiring line 310 may be electrically connected to the second wiring line 320 while making direct contact with the second wiring line 320. The first wiring line 310 and the second wiring line 320 include a contact point P where they make direct contact with each other. Then, the intermediate layer 500 includes a hole 510, and the first wiring line 310 and the second wiring line 320 may be connected to each other through the hole 510. That is, the hole 510 may be situated at the contact point P. The intermediate layer 500 may insulate the first wiring line 310 and the second wiring line 320 at portions other than the contact point P. Thus, an electrical short circuit can be prevented.

Accordingly, the first wiring line 310 may extend from the active area AA to the unactive area UA. That is, the first wiring line 310 is connected to the sensing electrode 200 in the active area AA, and may be connected to the second wiring line 320 in the unactive area UA. Meanwhile, the first wiring line 310 may be disposed on the deco layer 150 in the unactive area UA.

The first wiring line 310 may be transparent at a portion where the active area AA is disposed. Accordingly, the first wire line 310 may be made not to be visually recognized in the active area AA that is a screen area.

The first wiring line 310 may include a nano wire, a carbon nano tube (CNT), graphene, or various metals. The intermediate layer 500 may be disposed on the first wiring line 310 to prevent oxidation of the first wiring line 310 and protect the first wiring line 310.

The first wiring line 310 may include a first wiring line 311 that connects the transmission electrode 210 and a first wiring line 312 that connects the reception electrode 220.

The first wiring lines 311 that connect the transmission electrode 210 may make contact with the corresponding second wiring line 321. That is, the first wiring lines 311 of the transmission electrodes 210 disposed in the same direction of the substrate 100 may make contact with the corresponding second wiring line 321 through the holes 510 at the contact points P. Accordingly, the same signal may be applied to the transmission electrode 210.

The first wiring lines 312 that connect the reception electrode 220 may be connected to the second wiring lines 322 that connect the reception electrode 220. Meanwhile, the second wiring lines 320 are disposed on the first wiring line 310. That is, the second wiring lines 320 are disposed on the intermediate layer 500.

The second wiring line 320 may be disposed in the unactive area UA. The second wiring line 320 may be connected to the first wiring line 310 at a lower end of the substrate 100, and may be extracted to an upper end of the substrate 100. The second wiring line 320 may be connected to the circuit board at an upper end of the substrate 100.

The second wiring line 320 may be formed of a metal having an excellent electrical conductivity. For example, the second wiring line 320 may be formed of chrome (Cr), nickel (Ni), copper (Cu), aluminum (Al), silver (Ag), molybdenum (Mo), and an alloy thereof.

The second wiring line 320 may include a first wiring line 321 that connects the transmission electrode 210 and a second wiring line 322 that connects the reception electrode 220.

Ends of the second wiring lines 320 may be disposed at one end of the substrate 100. That is, pad parts 410 and 420 may be disposed at ends of the second wiring lines 320, and the pad parts 410 and 420 may be disposed at one end of the substrate 100.

The pad parts 410 and 420 may be connected to the circuit board. Various types of circuit boards may be applied as the circuit board, and for example, a flexible printed circuit board (FPCB) or the like may be applied.

Through this, the transmission electrode 210 and the reception electrode 220 may be disposed on the same plane as the substrate 100 so that a sectional circuit board may be used. Further, the width of a bezel may be reduced through the first wiring line 310 and the second wiring line 320. Accordingly, the width of the circuit board may be also reduced.

Meanwhile, the intermediate layer 500 may include a photosensitive film. Accordingly, after the sensing electrode 200 and the first wiring line 310 are formed, the intermediate layer 500 is laminated on the entire surface of the substrate 100 and the hole 510 may be formed through exposure and development processes.

The intermediate layer 500 may include a first intermediate part 501 and a second intermediate part 502.

The first intermediate part 501 may be disposed on the active area AA. The first intermediate part 501 may be disposed on the sensing electrode 200. The intermediate part 501 may prevent oxidation of the sensing electrode 200 and protect the sensing electrode 200.

Subsequently, the second intermediate part 502 may be disposed in the unactive area UA. The second intermediate part 502 may include the hole 510 so that the first wiring line 310 and the second wiring line 320 are connected to each other. The second intermediate layer 502 may be disposed on the first wiring line 310 to prevent oxidation of the first wiring line 310 and protect the first wiring line 310.

The first intermediate part 501 and the second intermediate part 502 may be integrally formed. The first intermediate part 501 and the second intermediate part 502 may include the same material, and may be formed through the same process. Accordingly, costs such as process costs, investment costs, and material costs can be reduced, and process time can be shortened by preventing repetition of processes. Further, because the first intermediate part 501 and the second intermediate part 502 are integrally formed, reliability can be enhanced by removing a border between the active area AA and the unactive area UA. That is, penetration of moisture and oxidation that may be generated at a border between the active area AA and the unactive area UA can be prevented.

Figure 8:
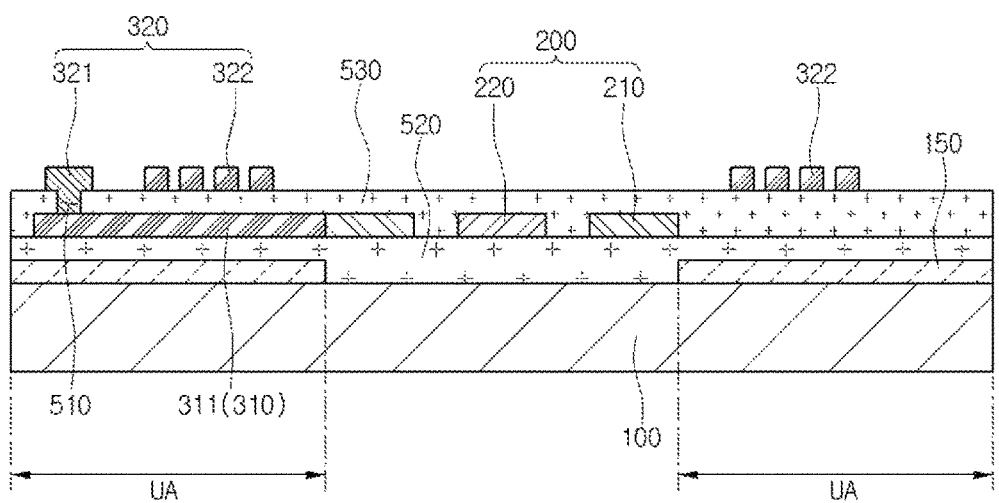
FIG. 8 is a sectional view of a touch window according to a third embodiment of the present disclosure.

Subsequently, referring to FIG. 8, a touch window according to a third embodiment of the present disclosure will be described. FIG. 8 is a sectional view of a touch window according to a third embodiment of the present disclosure.

The touch window according to the third embodiment of the present disclosure may include the same or similar configurations to those of the touch window according to the aforementioned embodiments of the present disclosure. For clear and brief description, a repeated description of the aforementioned embodiments may be omitted. The same reference numerals denote the same configurations.

The touch window according to the third embodiment of the present disclosure may include a first intermediate layer 520 and a second intermediate layer 530 disposed on the first intermediate layer 520.

The first intermediate layer 520 may be disposed on the deco layer 150. The first intermediate layer 520 may be disposed on the front surface of the deco layer 150. The first intermediate layer 520 may planarize the deco layer 150.

A sensing electrode 200, wiring lines 310 and 320, and the like may be disposed on the first intermediate layer 520. In particular, the sensing electrode 200 and a first wiring line 311 that makes contact with the sensing electrode 200 may be disposed on the first intermediate layer 520.

Subsequently, the sensing electrode 200 and a first wiring line 311 may be disposed on the second intermediate layer 530. The second wiring line 320 may be disposed on the second intermediate layer 530. The second intermediate layer 530 may include a hole 510. The first wiring line 311 and the second wiring line 320 may be connected to each other through the hole 510.

Figure 9:
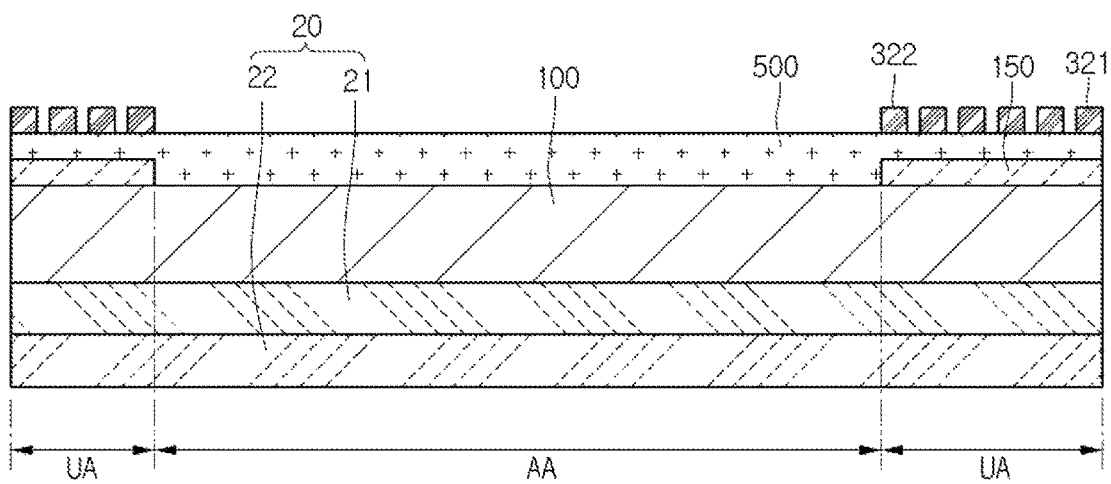
FIG. 9 is a view illustrating a display device including the touch windows according to the embodiments of the present disclosure.

Subsequently, referring to FIG. 9, a touch device including the touch windows according to the embodiments of the present disclosure will be described. FIG. 9 is a view illustrating a display device including the touch windows according to the embodiments of the present disclosure. A repeated description of the aforementioned embodiments may be omitted. The same reference numerals denote the same configurations.

Referring to FIG. 9, the display device may include a touch window 10 and a display panel 20. The touch window 10 may be formed of a separate configuration distinguished from the display panel 20, or may be integrally formed with the display panel 20.

When the touch window 10 has a separate configuration from the display panel 20, the touch window 10 may be disposed on the display panel 20, and the touch window 10 and the display panel 20 are combined with each other to configure the display device. Although not illustrated in the drawings, a bonding layer may be formed between the touch window 10 and the display panel 20. The bonding layer may be a transparent bonding layer. For example, the bonding layer may include an optically clear adhesive (OCA) or an optically clear resin (OCR).

When the touch window 10 is integrally formed with the display panel 20, a separate bonding layer is not necessary between the touch window 10 and the display panel 20. Although it is illustrated in the drawings that the substrate 100 of the touch window 10 and the upper substrate 21 of the display panel 20 are distinguished from each other, the substrate 100 and the upper substrate 21 may be integrally formed. That is, a sensing electrode, wiring lines 310 and 320, and the like may be formed on the upper surface of the upper substrate 21.

That is, although not illustrated in the drawings, when the touch window 10 is integrally formed with the display panel 20, the touch window 10 may include a sensing electrode and wiring lines formed on at least one surface of the upper substrate 21 or the lower substrate 22. For example, the sensing electrode and the wiring lines may be formed on the upper surface or the rear surface of the upper substrate 21. Further, the sensing electrode and the wiring lines may be formed on the upper surface of the lower substrate 22.

The substrate 100 of the touch window 10 may be a polarizer. For example, the upper substrate 21 may include a polarizer disposed on the uppermost side, and the sensing electrode and the wiring lines 310 and 320 may be formed on the upper surface of the polarizer. Meanwhile, the present disclosure is not limited thereto, but a separate polarizer may be disposed between the touch window 10 and the display panel 20 or a separate polarizer may be disposed on the touch window 10.

The touch window 10 may be the same as the touch windows according to the aforementioned embodiments. That is, although only the touch window 10 according to the first embodiment of the present disclosure is illustrated in the drawing, the touch window 10 may be the same as the touch windows according to the aforementioned second and third embodiments of the present disclosure.

A display area for outputting an image may be formed in the display panel 20. The display panel 20 applied to the display device may generally include an upper substrate 21 and a lower substrate 22. A data line, a gate line, a thin film transistor (TFT), and the like may be formed in the lower substrate 22. The upper substrate 21 may be joined to the lower substrate 22 to protect elements disposed on the lower substrate 22.

The display panel 20 may be formed in various forms according to the type of the display device. Then, the display device may be a liquid crystal display (LCD), an organic light emitting display (OLED), an electrophoretic display (EPD), a plasma display panel device (PDP), a field emission display device (FED), an electro luminescence display device (ELD), and an electro-wetting display (EWD), and accordingly, the display panel 20 may be configured in various forms.

The touch window or the display device according to the embodiments of the present disclosure may be applied to the touch device. For example, an example of the touch device is a portable terminal. The portable terminal may include an active area and an unactive area. The active area may sense a touch signal through a touch of a finger, and a command icon pattern, a logo, and the like may be formed in the unactive area.

Further, the touch window may include a flexible touch window that may be bent. Accordingly, the touch device including the touch window may be a flexible touch device. Accordingly, the user may defect or bend the touch device with a hand.

The touch window or the display device may be applied to a vehicular navigation system as well as to a touch device such as a portable terminal. Further, the touch window or the display device may be applied to the interior of the vehicle. That is, the touch window or the display device may be applied to various fields to which a touch window may be applied in a vehicle.

Accordingly, the touch window or the display device may be applied to a dashboard or the like as well as a personal navigation display (PND) to implement a center information display (CID). However, it is apparent that the embodiments of the present disclosure are not limited thereto but the touch device may be used in various electronic products such as a notebook and a home appliance.

The invention claimed is:

1. A touch window comprising:
   a substrate;
   a deco layer on the substrate;
   a sensing layer on the substrate, wherein the sensing layer includes:
   a reception electrode that receives a signal; and
   a transmission electrode that transmits a signal;
   an intermediate layer on the deco layer; and
   wiring lines electrically connected to the sensing layer,
   wherein holes are formed through the intermediate layer,
   wherein the wiring lines comprise first wiring lines and second wiring lines,
   wherein the sensing electrode, the deco layer, and the first wires are disposed between the intermediate layer and the substrate, and the second wires are disposed on an upper surface of the intermediate layer that is opposite the substrate,
   wherein the first wires are disposed on a planar surface formed by the deco layer and the sensing layer,
   wherein the first wiring lines includes a transmission first wiring line electrically coupled to the transmission electrode and a reception first wiring line electrically coupled to the reception electrode,
   wherein the second wiring lines includes a transmission second wiring line electrically coupled to the transmission electrode and a reception second wiring line electrically coupled to the reception electrode,
   wherein the transmission first wiring line and the transmission second wiring line are coupled to each other through one of the holes,
   wherein the reception first wiring line and the reception second wiring line are coupled to each other through another one of the holes, wherein the reception second wiring line and the transmission first wiring line cross each other on the substrate,
wherein the intermediate layer comprises:
a first intermediate part disposed on the active area; and
a second intermediate part integrally formed with the first intermediate part and disposed on the unactive area,
wherein the first intermediate part covers the sensing layer,
wherein the reception electrode includes a plurality of first electrode patterns, and the transmission electrode includes a plurality of second electrode patterns,
wherein a quantity of the first electrode patterns corresponds to a quantity of the second electrode patterns,
wherein a shape of the first electrode patterns corresponds to a shape of the second electrode patterns, and
wherein a material of the first wiring line and the second wiring line is different,
further comprising pads disposed at a first end of the substrate,
wherein the sensing electrode and the first wires are disposed on a lower surface of the intermediate layer facing the substrate, and the second wires and the pads are disposed on an upper surface of the intermediate layer that is opposite the lower surface,
wherein the holes are formed at a second end of the substrate that is opposite to the first end,
wherein the first wiring lines extend along the lower surface and between the sensing electrode and the holes in a first direction between the first end and the second end, and
wherein the second wiring lines extend between the holes and the pads along the upper surface, the second wiring lines extending from the holes in a second direction that intersects the first direction.

2. The touch window of claim 1, wherein the first wiring lines and the second wiring lines cross each other on the substrate.

3. The touch window of claim 2, wherein the first wiring lines are disposed on the deco layer.

4. The touch window of claim 2, wherein the second wiring lines are disposed on the intermediate layer.

5. The touch window of claim 2, wherein the intermediate layer comprises a first intermediate layer and a second intermediate layer on the first intermediate layer.

6. The touch window of claim 5, wherein the first intermediate layer is disposed on the deco layer.

7. The touch window of claim 5, wherein the second intermediate layer is disposed on the first wiring lines.

8. The touch window of claim 1,
wherein the reception electrode and the transmission electrode are disposed on a same plane.

9. The touch window of claim 1, wherein the intermediate layer includes a photosensitive film.

10. The touch window of claim 1, wherein the first intermediate part and the second intermediate part include a same material.

* * * * *